Figure 1:
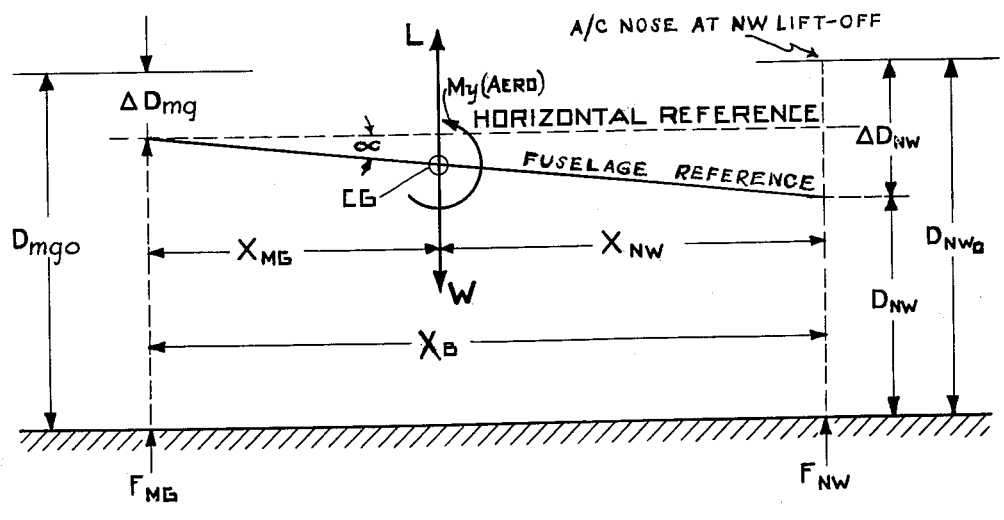

May 14, 1963 R. H. GOODWIN 3,089,257
SIMULATED ON-GROUND AIRCRAFT PITCHING MOMENT SYSTEM
Filed July 31, 1961 2 Sheets-Sheet 1

INVENTOR.
ROSCOE H. GOODWIN
BY
HIS ATTORNEY

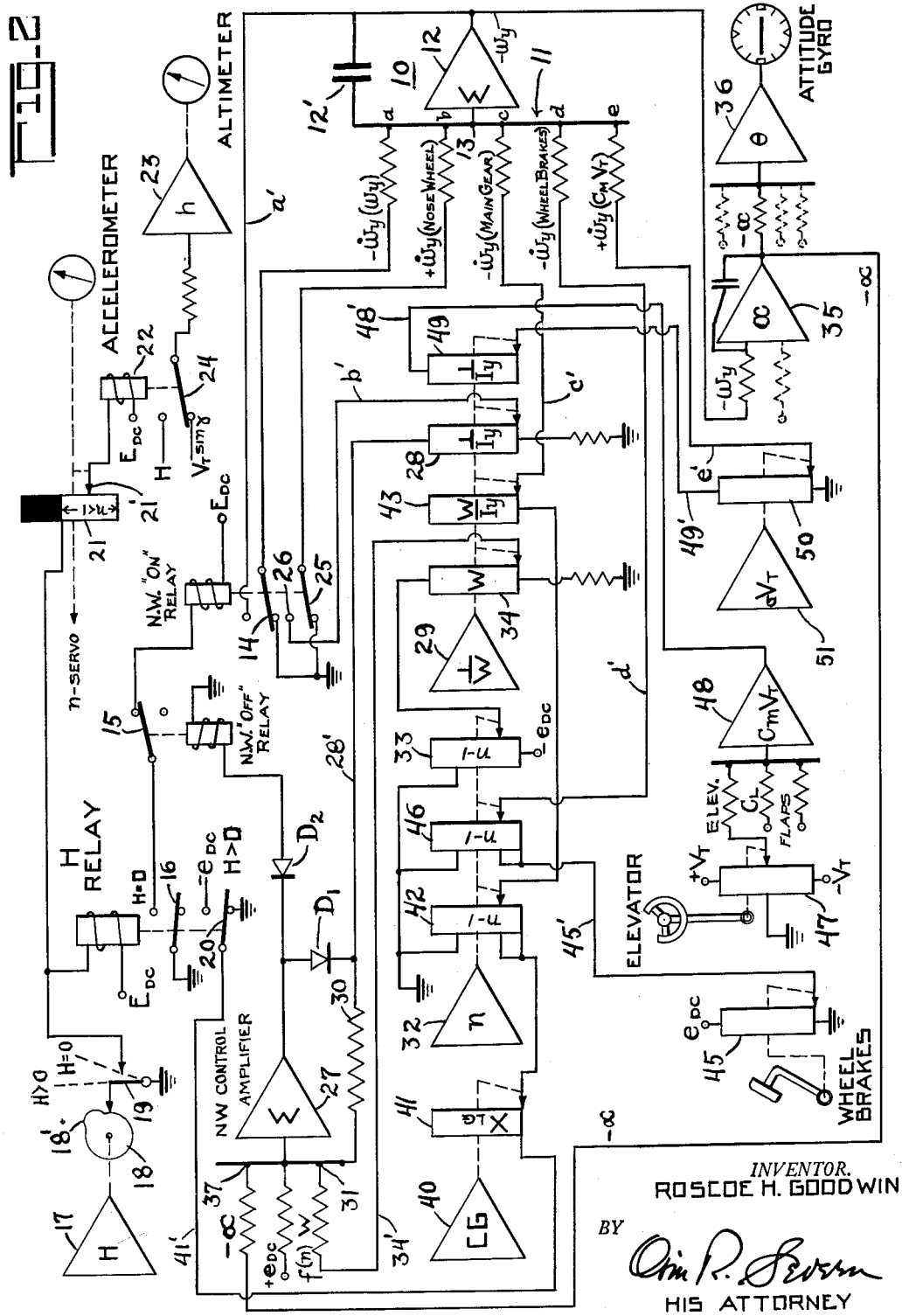

3,089,257
SIMULATED ON-GROUND AIRCRAFT PITCHING MOMENT SYSTEM

Roscoe H. Goodwin, Allendale, N.J., assignor to Curtiss-Wright Corporation, a corporation of Delaware
Filed July 31, 1961, Ser. No. 128,187
10 Claims. (Cl. 35—12)

This invention relates to aircraft simulating systems, and in particular to the simulation of pitching moment of large aircraft having a nose wheel and main landing gear, especially during the period when the aircraft is in contact with ground prior to and at take-off.

Aircraft simulating systems for runway maneuvers including take-off, have been designed on a generalization that the nose wheel and main landing gear may be considered as rigid parts of the fuselage. This however, is not the actual case since in practice load springs and air cushion are interpositioned between the fuselage and ground wheels; also there is some tire deflection between the wheels and runway. As the plane picks up speed during the take-off run there will be different rates of expansion of the main gear and nose wheel springs due to aerodynamic lift and pitching moment, so that the fuselage nose will rise somewhat before the nose wheel itself actually leaves the ground. That is, the expansion of the nose wheel spring holds the wheel on the runway during limited rising of the fuselage nose.

Accordingly where these factors are not taken into account, the simulation of airplane performance on the runway will be not only erroneous but misleading as regards the instrument indications on which the pilot bases his actions. That is, the erroneous pitching moment signals produced by the simulator are fed to the simulator's flight computer with the result that other flight factors such as rate of pitch, pitch attitude and angle of attack are erroneously computed. For this reason the "take-off" behavior of flight simulators based on the "rigid system" concept has been unsatisfactory.

A principal object of the present invention therefore is an improved aircraft simulating system for representing aircraft behavior on the runway, wherein accurate and realistic simulation of aircraft pitching moment is accomplished.

A further object is to provide an improved simulating system of the above character that is comparatively simple as regards additional circuitry and circuit components, and that is inexpensive as regards additional costs.

The invention will be more fully set forth in the following description referring to the accompanying drawings, and the features of novelty will be pointed out with particularity in the claims annexed to and forming a part of this specification.

Referring to the drawings, FIG. 1 is an elementary diagram illustrating moments and weight distribution between nose wheel (NW) and main landing gear (MG) when the aircraft is on the runway, and FIG. 2 is a diagrammatic illustration of analog circuitry for carrying out the invention.

A brief comparison of actual aircraft and flight simulator behaviors on take-off is here included for a better understanding of the invention. In an actual aircraft, when near take-off speed on the runway, the pilot eases back on the control column (elevator) and the nose of the plane rises and shortly afterward the plane flies off the ground. In the aforesaid "rigid system" simulators however, the pilot had to pull back excessively on the column in order to get the nose "up," as evidenced by the simulated pitch indication of the attitude gyro, with the result that as the nose came up there was serious "overshoot" as compared with the desired gradual and even increase in altitude. This difficulty had previously been considered as due to computed "ground effect" or other factors. However, compensating modification in this direction for improved take-off performance only introduced another problem, namely unrealistic "pitch-down" when approaching the field for a simulated landing, with undesired effects. For this reason, pilots who were familiar with actual flying techniques tended to "over-control" such simulators and therefore objected to its unrealistic behavior.

Referring now to FIG. 1, the aircraft weight components and moments are shown with reference to the center of gravity (CG) of the aircraft (not shown) which is represented as being at rest on the runway. The reacting forces at the main landing gear (MG) and nose wheel (NW) are indicated by $F_{MG}$ and $F_{NW}$ respectively. These forces act through the moment arms $X_{MG}$ and $X_{NW}$ about CG, the moment arms and forces being considered in the interest of simplicity as in the same plane as the longitudinal axis or fuselage reference line of the aircraft. The angle between this axis and the horizontal reference line is indicated angle-of-attack ($\alpha$), i.e., the angle between the wing and the line-of-flight (or motion) of the aircraft. During motion of the aircraft, the angle between the line-of-flight and the horizontal reference is flight angle ($\gamma$). That is, during the take-off run, this angle is zero.

As shown, the main gear and nose wheel springs are compressed by the aircraft weight (W) so that the nose of the airplane is depressed below the horizontal reference. The angle-of-attack is therefore negative, tending to hold the nose down until the elevator is operated to lift the nose on the take-off run. During nose-lift when aerodynamic lift (L) is first introduced, it will be apparent that the relationship of the MG and NW pitching moments continuously changes since aerodynamic pitching now is also present. The transition is complete at take-off where the pitching moments due to $F_{MG}$ and $F_{NW}$ disappear.

The following relationships can be used to illustrate the basic mechanics of FIG. 1:

Summation of vertical forces $$F_{MG} + F_{NW} + L - W = 0 \quad \text{(Equation I)}$$

Summation of moments at CG $$M_y(_{aero}) + F_{NW}X_{NW} - F_{MG}X_{MG} = 0 \quad \text{(Equation II)}$$

where $M_y(_{aero})$ is the aerodynamic moment about CG at the aircraft transverse or Y axis.

By transposing factors of Equations I and II $$M_y(_{aero}) - (W-L)X_{MG} + F_{NW}X_B = 0 \quad \text{(Equation III)}$$

where $$X_B \text{ is } (X_{MG} + X_{NW})$$

i.e. wheel base.

The nose wheel force is represented by $$F_{NW} = K_{NW}\Delta D_{NW} \quad \text{(Equation IV)}$$

where $K_{NW}$ is the "stiffness" factor of the nose wheel gear strut, i.e., force per unit of deflection, and $\Delta D_{NW}$ is the length of that portion of the nose wheel gear subject to compression. By reference to the graph, FIG. 1, $\Delta D_{NW}$ plus the static ground-to-nose length $D_{NW}$ equals $D_{NW_0}$, the total uncompressed nose wheel gear length.

At the point of nose wheel lift-off $$\Delta D_{MG} = (K_{MG})^{-1}(W-L)$$

From the geometry of FIG. 1 and by transposing $$\Delta D_{NW} = D_{NW_0} - D_{MG_0} + (K_{MG})^{-1}(W-L-X_B \tan \alpha) \quad \text{(Equation V)}$$

Finally, by combining Equations III, IV, and V, and recognizing that $(W-L)=W(1-n)$, wherein $n$ is normal acceleration, relationships in the form of $$\frac{M_y}{I_y}$$

are obtained for representing first derivative rate of pitch ($\dot{\omega}_y$) components, where $I_y$ is the moment of inertia about the Y axis, as follows:

$$\dot{\omega}_y = \frac{M_{y(aero)}}{I_y} + \frac{M_{y(brakes)}}{I_y} - \frac{W}{I_y}(1-n)X_{MG}$$
$$+ \frac{(K_{MG})^{-1}X_B W(1-n)K_{NW}}{I_y}$$
$$+ \frac{W_B(D_{NW}0 - D_{MG}0 - W_B \tan \alpha)K_{NW}}{I_y}$$

Hence, the above quantity when integrated represents rate of pitch, $\omega_y$.

FIG. 2 shows diagrammatically analog circuitry for carrying out the above-described concept wherein the $\omega_y$ simulated flight computer, and hence other related flight computer systems, are controlled according to realistic operation of actual aircraft during the take-off operation.

Following circuitry convention, the relays of FIG. 2 are shown deenergized, i.e., in power-off position. System power is applied for energization of the system by a suitable control switch, not shown.

The $\omega_y$ or rate of pitch computer is indicated by block-schematic at 10 and includes a summing input network 11 that is connected to the input side of an integrating type D.C. amplifier 12. The $\omega_y$ component signals, corresponding to the terms of the above equation, are fed respectively to separate parallel branch circuits of the network in the manner presently described for summation, and then are integrated at the amplifier 12. Amplifiers of this type include a parallel-connected condenser such as 12' and are well known in the art.

The derivation of the respective network input signals will be considered in order, followed by a general description of operation. These signals are fed to a common junction terminal 13 of the network through individual proportioning resistances that in turn are connected at terminals $a$, $b$, $c$, etc., as indicated to the common junction.

The signal at terminal $a$ is a feedback signal from the output circuit of amplifier 12. It is connected to the network through the switch 14 of the NW–ON relay only when the nose wheel is represented as touching the runway, and the a/c altitude with respect to runway is zero. Thus, the inherent damping characteristic of the feedback can represent the effect of the nose wheel shock strut. When the nose wheel is represented as lifted from the runway, the NW–ON relay is cut out by switch 15 of the NW–OFF relay and by switch 16 the H (altitude above runway) relay as presently described, so as to ground through switch 14 the input resistance at terminal $a$, thereby eliminating the nose wheel effect.

The control of the above-mentioned relays is essentially through the H servo 17. An H computer is shown for example in U.S. Patent No. 2,731,737, granted January 24, 1956, to R. G. Stern and need not be further described. In the present instance it includes a servo motor that positions a switch cam 18 according to relative altitude with respect to runway. The cam 18 is provided with an operating portion 18' that is positioned so as to close the switch 19 when $H=0$. When H exceeds zero, i.e., the airborne condition, the switch 19 is open. For illustrative purpose only, the H servo is represented in the airborne condition.

The H relay is directly controlled by the aforesaid switch 19, and it in turn operates the H relay switches 16 and 20. As previously mentioned, the H relay switch 16 controls the ground circuit of the NW–ON relay. The control of the NW–OFF relay will be described in connection with the nose wheel control operation.

The altimeter circuit is also controlled by the cam switch 19 through a switch card 21 that is controlled by the normal acceleration $(n)$ servo. The altimeter relay 22 is adapted to be energized only when runway altitude H is zero, and $n$ is less than unity. In this position the altimeter simply reads runway altitude.

When H exceeds zero or $n$ equals or is greater than unity, the altimeter relay is deenergized and the altimeter servo 23 is energized through the relay switch 24 from the normal flight circuit, represented by the vertical airspeed component $V_T \sin \gamma$.

The signal at terminal $b$ represents the pitching moment due to nose wheel on runway. This signal is cut out as indicated by the NW–ON relay at switch 25 during the airborne condition, and is connected to the network at switch contact 26 when the nose wheel is on the runway. The primary signal is produced by a nose wheel control summing ($\Sigma$) amplifier 27 as will presently be described. This signal is combined with functions of W and $I_y$ by a function generator or potentiometer 28 (hereinafter for brevity referred to as "pot") of a D.C. servo system 29 representing $$\frac{1}{W}$$

i.e., the reciprocal of gross weight. A simulated gross weight computer is shown for example in Patent No. 2,842,866, granted July 15, 1958, to Stern et al. The servo system here is shown for simplicity in block form, it being understood that the system includes a servo amplifier and servo motor for operating the function pots as well known in the art. The function pots may be of the common wound-card type to represent the function indicated.

The nose wheel control or "lift-off" amplifier 27 dominates the $\omega_y$ operation at nose wheel lift-off. That is, its output signal changes polarity, representing the change of sense of the nose wheel moment. By explanation and assuming the airplane is on ground and at zero airspeed, $F_{NW}$, FIG. 1, is simply static weight. During the take-off run, aerodynamic lift and pitching moment cause airplane nose lift with consequent gradual decrease of $F_{NW}$ until at lift-off it is zero. After lift-off, the physical force remains zero, but theoretically it is represented by a force opposite in polarity to that which existed when the nose wheel was in contact with ground.

As shown in FIG. 2, the output of amplifier 27 is positive in sense when the airplane and nose wheel are on ground, i.e., $H=0$. Thus diode $D_1$ is conducting and a feedback path is established through the megohm resistor 30. The diode $D_2$ is non-conducting, thereby keeping the NW–OFF relay in cut-out position. Under these conditions, the NW amplifier 27 behaves as a conventional summing amplifier, computing the NW moment which is fed into the $\omega_y$ amplifier 12 via $$\frac{1}{I_y}$$

pot 28 and NW–ON relay switch 25–26.

When the nose wheel leaves ground, the output of amplifier 27 reverses in polarity, as will be apparent from the nature of the $f(n)W$ signal at input terminal 31. This signal is derived from the $n$ servo 32 ($n-1$ function pot 33) and the $$\frac{1}{W}$$

servo 29 (W function pot 34). Typical $n$ servo input circuitry is shown in Patent No. 2,858,623, granted November 4, 1958, to Stern et al. and therefore need not be repeated here.

As the take-off progresses, the normal acceleration, $n$, increases from zero at standstill to unity, i.e., $n=1$, when the airplane develops enough lift to become airborne. Thus the negative signal at pot 33 fades to zero at the airborne condition. Some time before $n=1$, angle of attack will have reversed in sense as the airplane nose rises above the horizontal reference. At this point the $\alpha$ signal reverses to positive polarity. The resultant input signal polarity at amplifier 27 therefore is determined by the relative values and the polarities of signals $\alpha$, $e_{DC}$, and $f(n)W$. When the resultant input signal becomes positive, the amplifier output is negative so that the signal path through diode $D_1$ is now blocked. The signal path through diode $D_2$ becomes conducting, thereby energizing the NW–OFF relay, and opening switch 15, so as to cut out the NW–ON relay. This represents, as previously stated, the nose wheel lift-off condition at $\omega_y$ amplifier 12.

In passing, the $\alpha$ signal is produced by the angle-of-attack integrator system indicated at 35. This integrator for the on-ground condition, is energized primarily by the $-\omega_y$ signal from the $\omega_y$ amplifier 12 and its output $\alpha$ is fed to the pitch attitude or $\theta$ servo system 36 for operating the simulated attitude gyro as shown. The attitude gyro will thus indicate the on-ground pitch attitude since for this condition the flight angle $\gamma$ is zero; i.e., $\theta = \gamma + \alpha$, hence $\theta = \alpha$. Typical $\alpha$ and $\theta$ servo systems are shown in the above-cited Patent 2,731,737.

Referring again to the nose wheel lift-off summing amplifier 27, the feedback path through the high resistance 30 is blocked when diode $D_1$ stops conducting as the amplifier output reverses to negative polarity. This results in a large increase in the gain of amplifier 27 and therefore high sensitivity to the nose wheel lift-off condition. As above stated, the NW–OFF and NW–ON relays are energized and deenergized respectively when diode $D_2$ conducts current due to the reversed polarity, so that the NW–ON relay remains deenergized, thereby cutting out the $\omega_y$ feedback signal at network terminal $a$ and converting the $\omega_y$ amplifier 12 from a summing to an integrating amplifier for the normal nose wheel lift-off condition. It will be noted that on landing, the entire procedure is reversed with the NW–OFF and NW–ON being controlled in accordance with the closure of the H cam switch 19 when $H=0$.

The $\omega_y$ component signal representing main gear pitching moment is fed to network terminal $c$ from the center-of-gravity (CG) servo system 40 ($X_{LG}$ function pot 41), the $n$ system ($n-1$ function pot 42), and the $$\frac{1}{W}$$

system 29 ($W/I_y$ function pot 43). The CG system may be instructor-controlled to represent cargo, fuel, etc., distribution. The resultant signal represents the third term, that is, pitching moment due to the main gear, of the final $\omega_y$ equation, supra.

Pitching moment due to application of wheel brakes is represented by the signal at network terminal $d$. This signal is a function of normal acceleration $n$ and the amount of braking force, and is produced by the "wheel brakes" pot 45 and the $n$ servo pot 46, from which it is fed by lead $d'$ to the network terminal $d$. This signal is represented by the second term, namely pitching moment due to wheel braking, of the aforesaid final equation.

Pitching moment due to aerodynamic factors is represented by the signal at the network terminal $e$. This signal is a function of such things as the lift coefficient $C_L$, and wing flaps and elevator deflection. When the elevator is pulled back to raise the nose during the take-off run, the elevator pot 47 which is energized at its terminals by oppositely polarized D.C. voltages representing $V_T$, produces a positive signal that is fed to the $C_m V_T$ summing amplifier 48. This amplifier also receives pitching moment signals such as $C_L$ and wing flap deflection from the simulator flight computer. The $C_L$ signal and the flaps signal may be computed as shown for example in the aforesaid Patent No. 2,858,623. The resultant signal from the $C_m V_T$ amplifier is fed by lead 48' to energize the $1/I_y$ function pot 49 of the $1/W$ servo 29 and the signal derived therefrom is fed by lead 49' to energize the pot 50 of the $\sigma V_T$ servo 51. A $\sigma V_T$ computing servo is shown in the aforesaid Patent No. 2,731,737. The complete signal is derived from pot 50 and fed by lead $e'$ to the network terminal $e$ to represent the aforesaid aerodynamic pitching factors as expressed by the first term of the aforesaid final equation. The above term $\sigma$ is the ratio of air density at flight altitude and that at sea level. It is near unity for average landing conditions. The dependent variable $\omega_y$ is accordingly computed at the amplifier 12 in accordance with the algebraic summation, or integration, of independent variables represented by the input network signals.

Accordingly, the $\alpha$ integrator and the $\theta$ servo, which are controlled as above stated by the $\omega_y$ signal, determine realistically the attitude gyro indication which is relied on by the pilot during the simultaed take-off.

Summary of Operation

Assuming that the "airplane" is at standstill, the system power is on and the simulated take-off run is about to start, the H servo cam will be positioned at zero to close the switch 19 and so energize the H relay. The NW–ON relay will be energized through the H relay and the deenergized NW–OFF relay, thereby completing the feed-back damping circuit including the proportioning resistance at input terminal $a$. Also the H relay puts D.C. voltage on the CG pot 41 of the computing circuit for main gear pitching moment. The normal acceleration $n$ is zero, angle-of-attack $\alpha$ is negative, FIG. 1, so that the output of NW amplifier 27 blocks diode $D_2$ while providing a feedback circuit through $D_1$ for the amplifier. The aerodynamic factors $V_T$, $C_L$, etc., are zero, so that the only computing signals are at the NW and MG network terminals $b$ and $c$. Thus the attitude gyro will indicate pitch attitude according to the static angle-of-attack, FIG. 1.

As take-off power is applied and the take-off run progresses, the aerodynamic factors become more pronounced as described above. The pitching moment due to the $C_m V_T$ system increases the corresponding signal at network terminal $e$, the angle $\alpha$ becomes less negative and normal acceleration increases.

The relays remain in the positions above described until the $n$ and $\alpha$ inputs at the NW control amplifier 27 over-balance the fixed positive signal $e_{DC}$ (which signal takes into account initial negative $\alpha$, FIG. 1) so as to reverse the polarity of the NW amplifier output. At this point the nose wheel is represented at "lift-off" with the main gear still on the ground.

As the NW amplifier output reverses, the diodes $D_1$ and $D_2$ now become non-conducting and conducting respectively, resulting in greater sensitivity of the NW amplifier and in operation of the NW–OFF relay which cuts out the NW–ON relay. This converts the $\omega_y$ amplifier 12 to an integrator as the resistance shunt is now removed from the integrating condenser 12'; also the NW pitching signal at network terminal $b$ is cut out, since the nose wheel no longer has ground pitching moment effect. The main gear signal at terminal $c$ however remains in effect until the H servo indicates $H>0$, at which time the H cam 18 drops out the H relay, opening switch 20. This removes voltage from the CG pot 41, thereby reducing the MG signal at network terminal $c$ to zero. The simulated flight is now represented as airborne.

If, during the take-off run, the pilot decides against take-off and shuts off power, applies the wheel brakes, and pushes the column forward, negative pitching moment signals tending to bring the nose down (determined according to elevator deflection, pilot braking force and $n$) are applied at the network terminals $d$ and $e$, reversing $\omega_y$ and bringing the nose down.

For the landing operation, the H servo affects the relay control by energizing the H relay when $H=0$, i.e., at touch-down. However, the NW–ON relay cannot be energized until the NW–OFF relay drops out, and this depends on reversal of output polarity of the NW amplifier 27. In considering landing techniques, it will be apparent that such reversal takes place prior to touch-down due to negative angle-of-attack on the glide path and decreasing $n$ when engine power is reduced and flaps and landing gear are lowered. That is, the input signals $\alpha$ and $f(n)W$ become more negative so as to be overbalanced by the positive $e_{DC}$ signal, thereby causing reversal of output polarity and blocking the diode $D_2$. The NW–OFF relay accordingly drops out thereby, together with the H relay, establishing the ground circuit for the NW–ON relay. The system thereupon functions generally as described for on-ground operation, with the $\omega_y$ amplifier now operating as a summer and the braking, elevator deflection, etc., pitching moments tending to bring the nose down to the final position indicated in FIG. 1.

At the instant before touch-down, the airplane may be "flared" for a nose-high landing. In such case, the $\alpha$ input signal at the NW amplifier is positive, thereby again picking up the NW–OFF relay and holding it in until $\alpha$ decreases to touch-down attitude. When the H relay picks up, indicating contact between the main gear and ground, the NW–ON relay is subsequently energized as above described.

It should be understood that this invention is not limited to specific details of construction and arrangement thereof herein illustrated, and that changes and modifications may occur to one skilled in the art without departing from the spirit of the invention.

What is claimed is:

1. In aircraft simulating apparatus having a flight computer for producing signals representing flight factors and forces acting on the aircraft, means for simulating varying pitching moment during the take-off run and landing of a simulated aircraft, said pitching moment including components representing the effects of main and nose wheel landing gear, comprising a rate of pitch computer having an input network that is energized by a plurality of signals representing different pitching moments including signals representing both main and nose wheel pitching moments, a nose wheel pitching moment computer for producing the nose wheel moment signal, and means controlled by said nose wheel computer for applying said signal to said network according to simulated "on" or "off" position of the nose wheel with respect to the runway.

2. Simulating apparatus as specified in claim 1 wherein the nose wheel computer is controlled according to signals representing functions of aircraft attitude and normal acceleration and the signal applying means is controlled according to the polarity of the output of the computer.

3. Simulating apparatus as specified in claim 1 wherein the nose wheel computer is energized by signals representing functions of angle-of-attack and normal acceleration and the signal applying means comprises a relay that is controlled according to the polarity of the computer output.

4. Simulating apparatus as specified in claim 2 wherein the nose wheel computer comprises a summing amplifier having diode means connected in the output circuit thereof for controlling energization of the signal applying means.

5. Simulating apparatus as specified in claim 4 wherein second diode means is connected to the output of the nose wheel computer for completing an amplifier feedback circuit according to computer output polarity for increasing the gain of said amplifier for the nose wheel "on-ground" condition.

6. Simulating apparatus as specified in claim 1 wherein the rate of pitch computer is an integrating means, and the signal applying means comprises a relay that is operable both to connect the pitching moment signal to the network and to connect a damping feed-back signal to the computer input when the nose wheel is represented as "on-ground."

7. Simulating apparatus as specified in claim 1 wherein an altitude-above-runway (H) relay is controlled according to simulated altitude, and said signal applying means is controlled jointly by said relay and by the output of said nose wheel computer.

8. Simulating apparatus as specified in claim 1 having also computing circuitry for producing a main gear pitching moment signal, and application of said signal to said network is controlled by said means controlled by the nose wheel computer.

9. Simulating apparatus as specified in claim 1 having a wheel brake pitching moment computer for producing a pitching moment signal for said network, said computer being controlled by signals representing brake force and normal acceleration.

10. Simulating apparatus as specified in claim 1 having computer means for producing a signal representing aerodynamic pitching moment for said network, and means controlled according to elevator deflection and coefficient of lift for energizing said computer.

References Cited in the file of this patent
UNITED STATES PATENTS

| | | |
|---|---|---|
| 2,636,285 | Fogarty | Apr. 28, 1953 |
| 2,731,737 | Stern | Jan. 24, 1956 |
| 2,842,867 | Dehmel | July 15, 1958 |